(12) United States Patent
Shiraishi

(10) Patent No.: US 12,103,426 B2
(45) Date of Patent: Oct. 1, 2024

(54) ENERGY STORAGE APPARATUS AND METHOD FOR MANAGING ENERGY STORAGE DEVICE

(71) Applicant: GS Yuasa International Ltd., Kyoto (JP)

(72) Inventor: Takeyuki Shiraishi, Kyoto (JP)

( * ) Notice: Subject to any disclaimer, the term of this patent is extended or adjusted under 35 U.S.C. 154(b) by 972 days.

(21) Appl. No.: 17/045,638

(22) PCT Filed: Apr. 11, 2019

(86) PCT No.: PCT/JP2019/015728
§ 371 (c)(1),
(2) Date: Oct. 6, 2020

(87) PCT Pub. No.: WO2019/203104
PCT Pub. Date: Oct. 24, 2019

(65) Prior Publication Data
US 2021/0155113 A1    May 27, 2021

(30) Foreign Application Priority Data
Apr. 17, 2018 (JP) .................. 2018-079104

(51) Int. Cl.
*H02J 7/00* (2006.01)
*B60L 58/12* (2019.01)
*B60R 16/033* (2006.01)
*H01M 10/48* (2006.01)

(52) U.S. Cl.
CPC ............ *B60L 58/12* (2019.02); *B60R 16/033* (2013.01); *H01M 10/48* (2013.01)

(58) Field of Classification Search
None
See application file for complete search history.

(56) References Cited

U.S. PATENT DOCUMENTS

| | | | | |
|---|---|---|---|---|
| 2006/0001429 | A1* | 1/2006 | Huang | G01R 31/389 |
| | | | | 324/426 |
| 2008/0277176 | A1* | 11/2008 | Akimoto | B60W 10/06 |
| | | | | 290/40 C |
| 2014/0104739 | A1 | 4/2014 | Nakamoto et al. | |
| 2015/0336459 | A1 | 11/2015 | Nakamoto et al. | |

(Continued)

FOREIGN PATENT DOCUMENTS

| | | |
|---|---|---|
| JP | H05-316658 A | 11/1993 |
| JP | 2013-073897 A | 4/2013 |

(Continued)

OTHER PUBLICATIONS

JP-2015164378-A English machine translation (Year: 2023).*
International Search Report (ISR) (PCT Form PCT/ISA/210), in PCT/JP2019/015728, dated Jun. 18, 2019.

*Primary Examiner* — Arun C Williams
(74) *Attorney, Agent, or Firm* — MCGINN I.P. LAW GROUP, PLLC

(57) ABSTRACT

An energy storage apparatus includes: an energy storage device; an acquisition unit (current sensor) that acquires information with which the use of the energy storage device can be determined; and a management unit that manages the energy storage device in a set management mode. The management unit sets the management mode of the energy storage device in accordance with the information acquired by the acquisition unit.

11 Claims, 9 Drawing Sheets

(56) References Cited

U.S. PATENT DOCUMENTS

2017/0001525 A1 1/2017 Nakamoto et al.
2017/0253128 A1 9/2017 Nakamoto et al.
2018/0331552 A1 11/2018 Tsuchiyama

FOREIGN PATENT DOCUMENTS

| JP | 2014-110709 A | | 6/2014 |
| --- | --- | --- | --- |
| JP | 2015164378 A | * | 9/2015 |
| JP | 2015-201289 A | | 11/2015 |
| JP | 2017-152333 A | | 8/2017 |
| JP | 2017-216879 A | | 12/2017 |
| JP | 2018-018801 A | | 2/2018 |
| KR | 10-2007-0076316 A | | 7/2007 |
| WO | WO 2017/094311 A1 | | 6/2017 |

* cited by examiner

Fig. 3
(A)
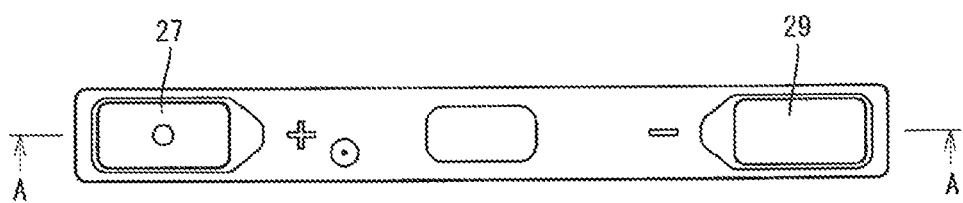
(B)
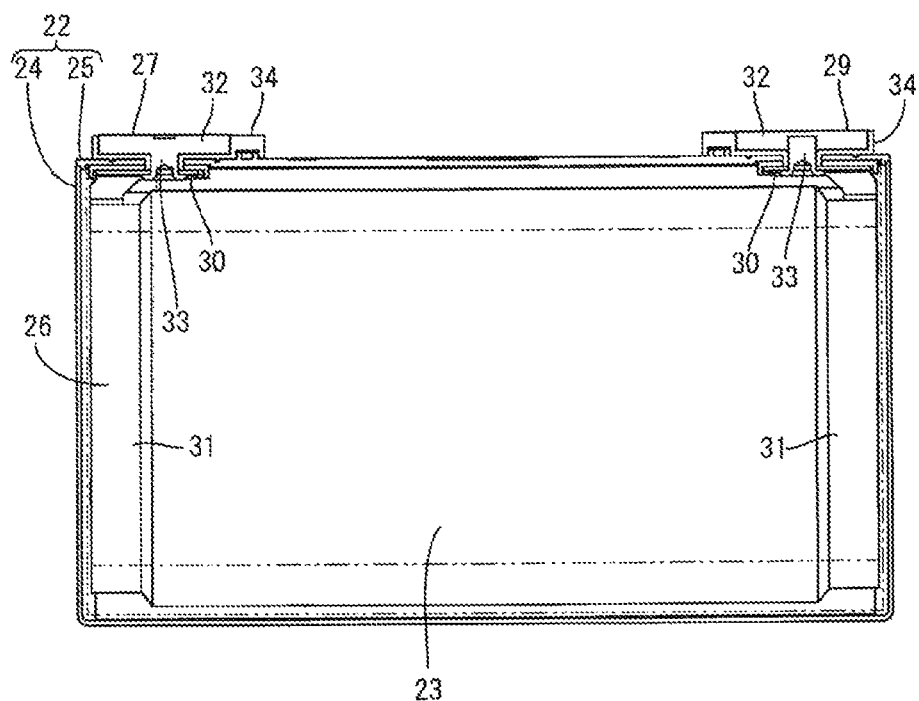

Fig. 8
(A)
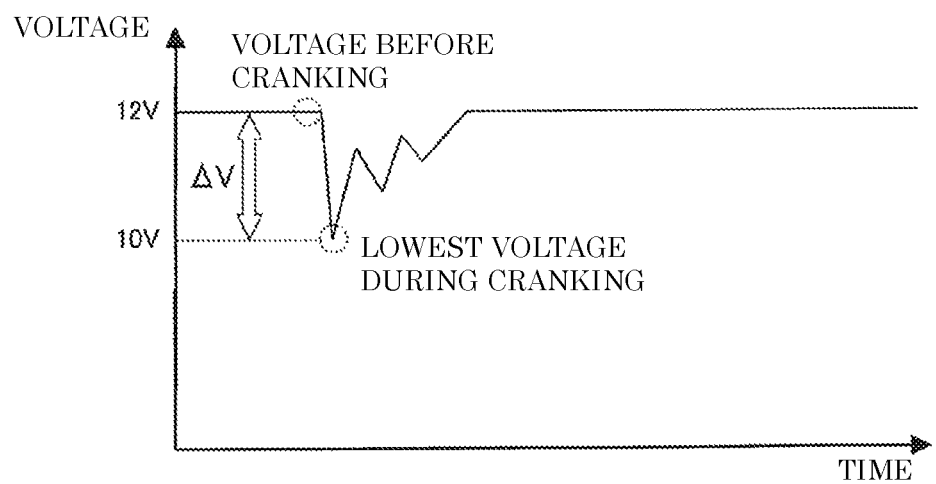
(B)
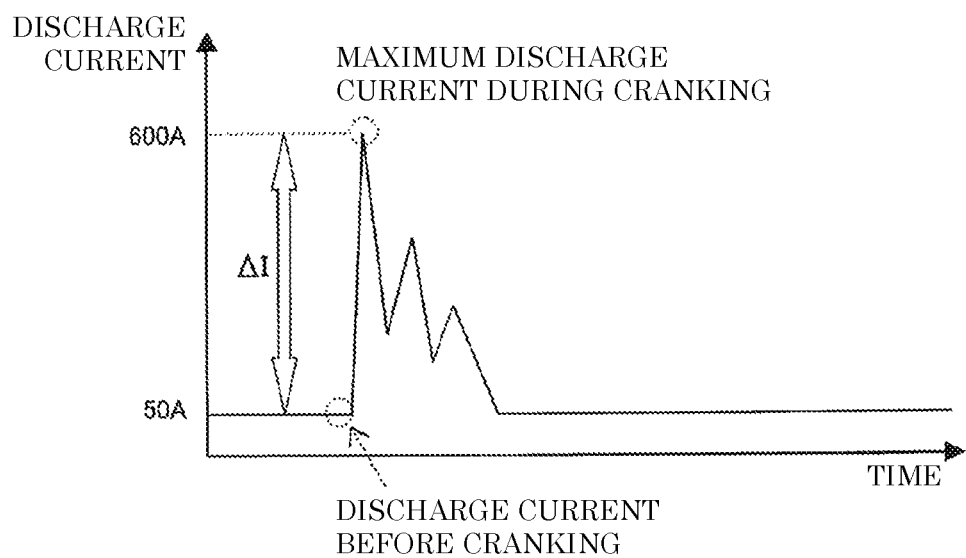

ENERGY STORAGE APPARATUS AND METHOD FOR MANAGING ENERGY STORAGE DEVICE

TECHNICAL FIELD

A technology disclosed in the present specification relates to an energy storage apparatus and a method for managing an energy storage device.

BACKGROUND ART

Conventionally, there has been known an energy storage apparatus including an energy storage device, such as a lithium ion battery, and a management unit (battery management system: BMS) that manages the energy storage device (e.g., see Patent Document 1).

There are various uses of such an energy storage apparatus, including a use for starting in which electric power is supplied to a starter that starts an engine of a vehicle (e.g., see Patent Document 1), a use for auxiliary equipment (e.g., see Patent Document 2) in which electric power is supplied to auxiliary equipment (headlight, air conditioner, audio equipment, door locking mechanism, etc.) mounted on a vehicle such as an electric vehicle or a hybrid vehicle, and a use for backup in which when a state of charge (SOC) of an energy storage apparatus for starting or for auxiliary equipment decreases, electric power is supplied in place of the energy storage apparatus. The energy storage apparatus for auxiliary equipment may be used for starting a hybrid system of a hybrid vehicle in addition to supplying electric power to auxiliary equipment.

PRIOR ART DOCUMENTS

Patent Documents

Patent Document 1: JP-A-2017-216879
Patent Document 2: JP-A-2018-018801

SUMMARY OF THE INVENTION

Problems to be Solved by the Invention

Generally, an energy storage device has a different appropriate management method (in other words, a management mode) depending on the use. For this reason, conventionally, a management unit has been prepared for each use, thus causing an increase in cost (development cost and management cost) related to the management unit.

The present specification discloses a technique for making a management unit having the same specification usable for various uses, thereby reducing the cost related to the management unit.

Means for Solving the Problems

An energy storage apparatus includes: an energy storage device; an acquisition unit that acquires information with which a use of the energy storage device can be determined; and a management unit that manages the energy storage device in a set management mode. The management unit sets the management mode of the energy storage device in accordance with the information acquired by the acquisition unit.

Advantages of the Invention

Since the management unit sets the management mode of the energy storage device in accordance with the information with which the use of the energy storage device can be determined, the energy storage device can be managed in accordance with the use. As a result, the management unit having the same specification becomes usable for various uses, and the cost related to the management unit can be reduced.

BRIEF DESCRIPTION OF THE DRAWINGS

FIG. 3(A) is a plan view of the energy storage device shown in FIG. 2, and FIG. 3(B) is a sectional view taken along line A-A.

FIG. 8(A) is a graph showing a change in a voltage during engine starting hold (during the cranking), and FIG. 8(B) is a graph showing a change in the current during the engine starting hold (during the cranking).

MODE FOR CARRYING OUT THE INVENTION

Summary of Present Embodiment

Figure 1:
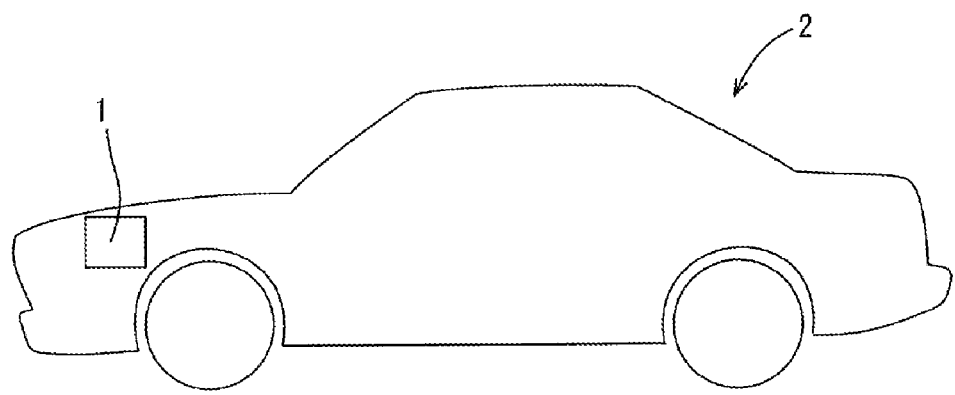
FIG. 1 is a schematic view of a vehicle on which an energy storage apparatus according to a first embodiment is mounted.

An energy storage apparatus includes: an energy storage device; an acquisition unit that acquires information with which a use of the energy storage device can be determined; and a management unit that manages the energy storage device in a set management mode. The management unit sets the management mode of the energy storage device in accordance with the information acquired by the acquisition unit.

According to the above energy storage apparatus, since the management unit sets the management mode of the energy storage device in accordance with the information with which the use of the energy storage device can be determined, the energy storage device can be managed in accordance with the use. As a result, the management unit having the same specification becomes usable for various uses, and the cost related to the management unit can be reduced.

For example, in the case of an energy storage apparatus mounted on a vehicle, there are various uses of the energy storage device, such as for starting, auxiliary equipment, and backup. For this reason, when the management unit is prepared in accordance with the use, the development cost increases accordingly. According to the above energy storage apparatus, the management unit of the energy storage apparatus sets the management mode corresponding to the use of the energy storage device, so that the development cost can be reduced as compared to when the management unit is developed for each use.

When the management unit is provided in accordance with the use, it may occur that even though the energy storage apparatus including the management unit for one use is in stock, the energy storage apparatus for another use is in short stock. This makes inventory management complicated. In contrast, according to the above energy storage apparatus, since the management mode corresponding to the use is set, it is possible to flexibly cope with a change in a sales plan for each use, thereby greatly facilitating the inventory management and contributing reduction in inventory. Therefore, the management cost of the energy storage apparatus can be reduced, and the versatility of the use increases.

In the case of the energy storage apparatus mounted on the vehicle, it is further possible to set the management mode in accordance with a voltage band (12 V, 24 V, 48 V, several hundred V (for driving an electric vehicle)), or set the management mode in accordance with the number of parallel energy storage devices. Even when an energy storage apparatus is to be sold for such a reason that the energy storage apparatus is in excess, it is possible to sell the energy storage apparatus without limiting the use, thus increasing the possibility of selling the energy storage apparatus. As thus described, there are many advantages in setting the management mode corresponding to the use.

The information may be information on an output status or an input/output status of the energy storage device.

The output status of the energy storage device is, for example, the discharge status of the energy storage device, and the input/output status is, for example, the discharge status and the charge status of the energy storage device. The output status and the input/output status of the energy storage device vary depending on the use. Thus, when the energy storage apparatus is to know what use the energy storage device is being used for, the output status and the input/output status are useful clues. According to the above energy storage apparatus, the information on the output status or the input/output status of the energy storage device is acquired, so that the energy storage device can be managed in accordance with the use.

The energy storage device may be mounted on a vehicle. The acquisition unit may be a current measurement unit that measures a current value of a discharge current of the energy storage device. The management unit may set a management mode corresponding to an energy storage device for starting, the energy storage device being configured to start an engine of the vehicle, when a current value equal to or greater than a first reference value is measured by the current measurement unit.

A large current (e.g., a current of 300 A or more) flows during the engine start. When the engine start is completed, a large current does not flow during a subsequent engine operation unless the engine is in an abnormal state such as a failure, and it can thus be determined that the energy storage apparatus is for starting when a large current flows. Thus, when a large current (i.e., a current value equal to or greater than the first reference value) is measured, the energy storage device can be managed in accordance with the use by setting a management mode corresponding to the energy storage device for starting.

The energy storage device may be mounted on a vehicle. The acquisition unit may include a current measurement unit that measures a current value of a current flowing through the energy storage device, and a communication unit that receives a signal with which a start and stop of the engine can be determined from the vehicle. The current measurement unit may measure a current value equal to or greater than a first reference value, and when the engine starts thereafter, the management unit sets a management mode corresponding to an energy storage device for starting, the energy storage device being configured to start the engine.

There is a possibility that a large current flows through the energy storage device due to an external short circuit. Thus, when the management mode corresponding to the energy storage device for starting is set only due to the flow of a large current, an incorrect management mode may be set. According to the above energy storage apparatus, the management mode corresponding to the energy storage device for starting is not set when the engine does not start after a large current (a current value equal to or greater than the first reference value) flows, whereby an error in the setting can be reduced as compared to when the determination is made only based on the current value.

When the engine starts without the current measurement unit measuring a current value equal to or greater than the first reference value, the management unit may set a management mode corresponding to an energy storage device for auxiliary equipment, the energy storage device supplying electric power to auxiliary equipment of the vehicle.

In the case of the energy storage device for auxiliary equipment, the engine starts without a large current (a current value equal to or greater than the first reference value) flowing from the energy storage device. According to the above energy storage apparatus, since the management mode is set in accordance with the energy storage device for auxiliary equipment when the engine starts without a large current flowing, the energy storage device can be managed in accordance with the use.

After the engine starts without the current measurement unit measuring a current value equal to or greater than the first reference value and before the engine stops, when a current value equal to or greater than a second reference value that is smaller than the first reference value is measured, the management unit may set a management mode corresponding to an energy storage device for auxiliary equipment, the energy storage device supplying electric power to the auxiliary equipment of the vehicle, and when the engine stops without the current value equal to or greater than the second reference value being measured, the management unit may set a management mode corresponding to an energy storage device for backup.

In the case of the energy storage device for auxiliary equipment, the engine starts without a large current (a current equal to or greater than the first reference value) flowing from the energy storage device, and a medium current (a current equal to or greater than the second reference value and less than the first reference value) flows before the engine stops. The medium current flows so as to supply electric power from the energy storage device to the auxiliary equipment. In contrast, in the case of the energy storage device for backup, the engine starts without a large current flowing from the energy storage device, and thereafter, the engine stops without a medium current flowing. Thus, according to the above energy storage apparatus, the energy storage device can be managed in accordance with the use.

The management of the energy storage device may be the estimation of an internal resistance value of the energy storage device, and the management unit may set timing for estimating the internal resistance value in accordance with the information.

Appropriate timing for estimating the internal resistance value varies depending on the use of the energy storage device. According to the above energy storage apparatus, the timing for estimating the internal resistance value is set in accordance with the information with which the use of the energy storage device can be determined, so that the internal resistance value can be estimated at appropriate timing in accordance with the use of the energy storage device.

The management of the energy storage device may be estimation of a state of the energy storage device by using estimation data, and the management unit sets the estimation data in accordance with the information.

The estimation data used for estimating the state of the energy storage device varies depending on the use of the energy storage device. According to the above energy storage apparatus, the state of the energy storage device can be estimated more accurately than when the same estimation data is used regardless of the use.

The management unit may set a process of detecting the abnormality of the energy storage apparatus in accordance with the information.

The abnormality detected by the energy storage apparatus varies depending on the use. According to the above energy storage apparatus, the abnormality of the energy storage apparatus can be appropriately detected in accordance with the use.

The acquisition unit may be a communication unit for receiving the information from external equipment.

According to the above energy storage apparatus, by receiving information from external equipment, a management mode can be set according to the use of the energy storage device.

The acquisition unit may be an operation unit that receives an input operation for the information.

According to the above energy storage apparatus, the management mode corresponding to the use of the energy storage device can be set by receiving an input operation for the information on the use of the energy storage device.

At a time of setting a management mode corresponding to the information, the management unit may disable the energy storage apparatus when a use after the setting is a use prohibited from being switched from a use before the setting.

In the above energy storage apparatus, since the management mode corresponding to the use is set, the energy storage apparatus having been used for one use can be recycled (reused) thereafter for another use. However, an energy storage apparatus having been used for one particular use may not be desired to be recycled thereafter for another particular use. Therefore, in this case, switching from one specific use to another specific use is prohibited. According to the above energy storage apparatus, the energy storage apparatus can be prevented from being recycled for a prohibited use.

A technique disclosed by the present specification can be achieved in various modes such as an apparatus, a method, a computer program for achieving the apparatus or the method, and a recording medium where the computer program is recorded.

First Embodiment

An embodiment will be described with reference to FIGS. 1 to 9.

(1) Configuration of Energy Storage Apparatus

As shown in FIG. 1, an energy storage apparatus 1 according to a first embodiment is mounted on a vehicle 2. The vehicle 2 may be an engine vehicle having an engine, such as a gasoline engine or a diesel engine, or may be an electric vehicle, a hybrid vehicle, a plug-in hybrid vehicle, or the like. The engine vehicle may be a so-called idling stop vehicle. The energy storage apparatus 1 is selectively usable for various uses in the vehicle 2. In the following description, the uses for starting, auxiliary equipment, and backup will be described as examples of the use of the energy storage apparatus 1.

Figure 2:
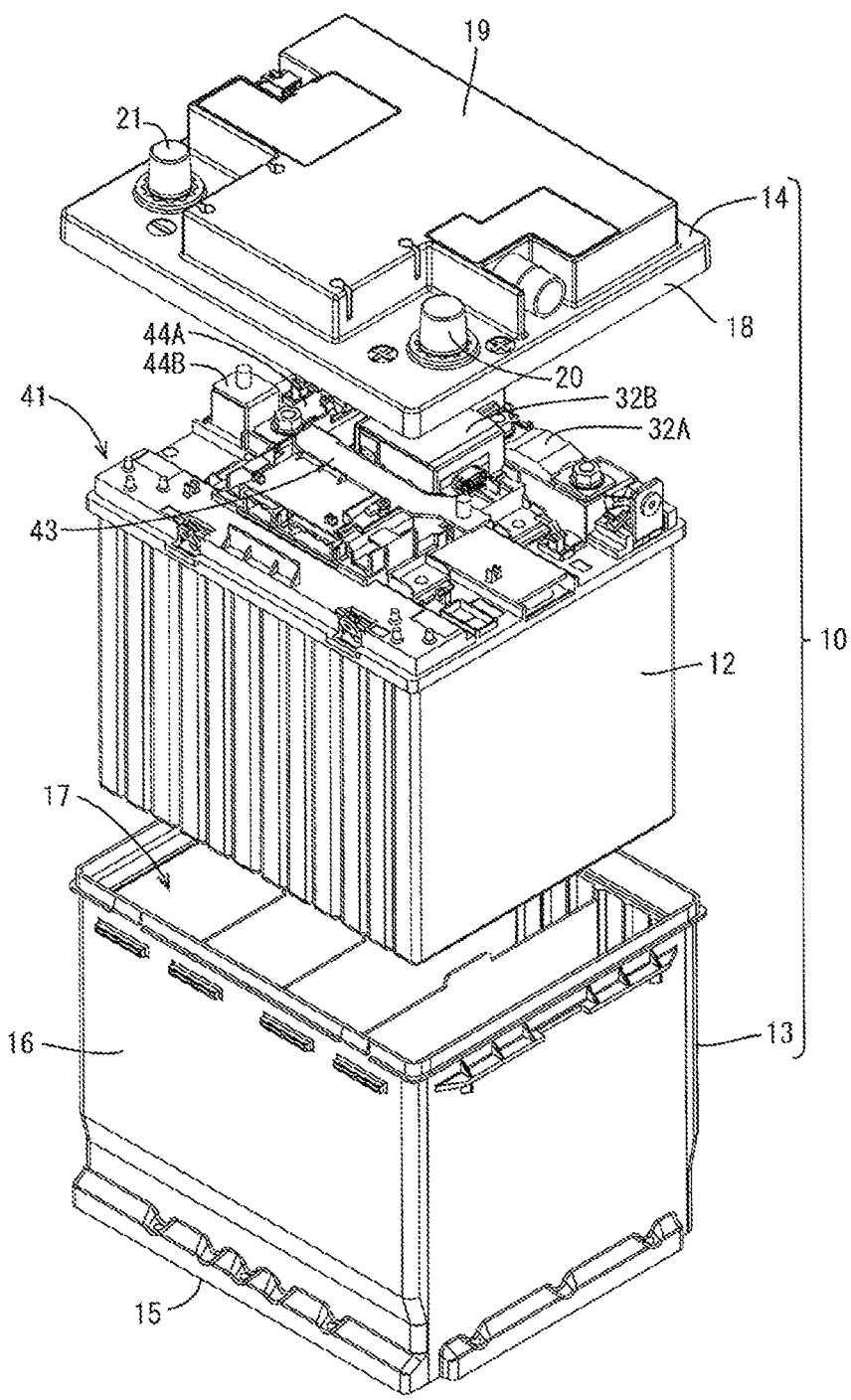
FIG. 2 is an exploded perspective view of the energy storage apparatus.

As shown in FIG. 2, the energy storage apparatus 1 includes an exterior body 10 and a plurality of energy storage devices 12 accommodated inside the exterior body 10. The exterior body 10 includes a body 13 and a lid 14 made of a synthetic resin material. The body 13 has a bottomed cylindrical shape and is made up of a bottom surface portion 15 having a rectangular shape in a plan view and four side surface portions 16 rising from four sides thereof to form a cylindrical shape. An upper opening 17 is formed at the upper-end portion by the four side surface portions 16.

The lid 14 is rectangular in the plan view, and the frame body 18 extends downward from four sides thereof. The lid 14 closes the upper opening 17 of the body 13. A protrusion 19 having a substantially T-shape in the plan view is formed on the upper surface of the lid 14. On the upper surface of the lid 14, a positive external terminal 20 is fixed to a corner of one of two locations where no protrusion 19 is formed, and a negative external terminal 21 is fixed to a corner of the other location.

The energy storage device 12 is a rechargeable secondary battery, specifically, a lithium ion battery, for example. As shown in FIGS. 3(A) and 3(B), the energy storage device 12 has an electrode assembly 23 accommodated in a rectangular parallelepiped case 22, together with a nonaqueous electrolyte. The case 22 is made up of a case body 24, and a cover 25 for closing an opening above the case body.

Although not shown in detail, the electrode assembly 23 is formed by disposing a separator, made of a porous resin film, between a negative electrode element with an active material applied to a substrate made of copper foil and a positive electrode element with an active material applied to a substrate made of aluminum foil. Each of these is a belt-like shape and is wound in a flat shape so as to be able to be accommodated in the case body 24 in a state where the negative electrode element and the positive electrode element are displaced from each other on the opposite side in the width direction with respect to the separator.

A positive electrode terminal 27 is connected to the positive electrode element via a positive current collector 26. A negative electrode terminal 29 is connected to the negative electrode element via a negative current collector 28. A positive current collector 26 and a negative current collector 28 each have a flat base 30 and a leg 31 extending from the base 30. A through hole is formed in the base 30. The leg 31 is connected to the positive electrode element or the negative electrode element. The positive electrode terminal 27 and the negative electrode terminal 29 each have a terminal body 32 and a shaft 33 projecting downward from the center part of the lower surface thereof. The terminal body 32 and the shaft 33 of the positive electrode terminal 27 are integrally formed using aluminum (single material). In the negative electrode terminal 29, the terminal body 32 is made of aluminum, the shaft 33 is made of copper, and these are assembled. The terminal bodies 32 of the positive electrode terminal 27 and the negative electrode terminal 29 are arranged at both ends of the cover 25 via gaskets 34 made of an insulating material and are exposed outward from the gaskets 34.

Figure 4:
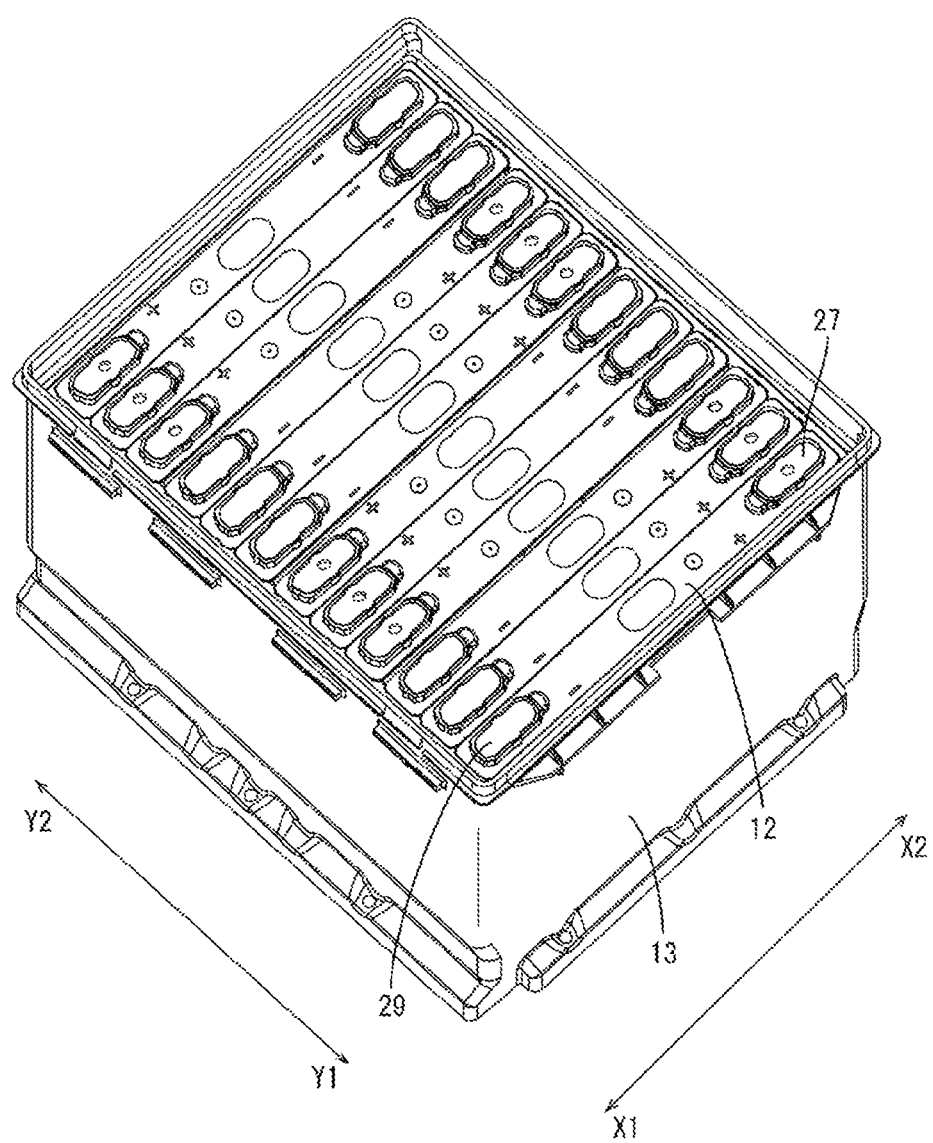
FIG. 4 is a perspective view showing a state in which an energy storage device is accommodated in a body of FIG. 1.

As shown in FIG. 4, a plurality of (e.g., 12) energy storage devices 12 are accommodated in the body 13 while being provided in parallel in the width direction. Here, the three storage devices 12 are arranged as a set from one end side to the other end side (arrow Y1 to Y2) of the body 13 such that the terminal polarities of the adjacent storage devices 12 are the same in the same pair, and the terminal polarities of the adjacent energy storage devices 12 are opposite in the adjacent pair. In the three energy storage devices 12 (first set) located closest to the arrow Y1 side, the arrow X1 side is a negative electrode, and the arrow X2 side is a positive electrode. In the three energy storage devices 12 (second set) adjacent to the first set, the arrow X1 side is a positive electrode, and the arrow X2 side is a negative electrode. Further, a third set adjacent to the second set has the same arrangement as the first set, and a fourth set adjacent to the third set has the same arrangement as the second set.

Figure 5:
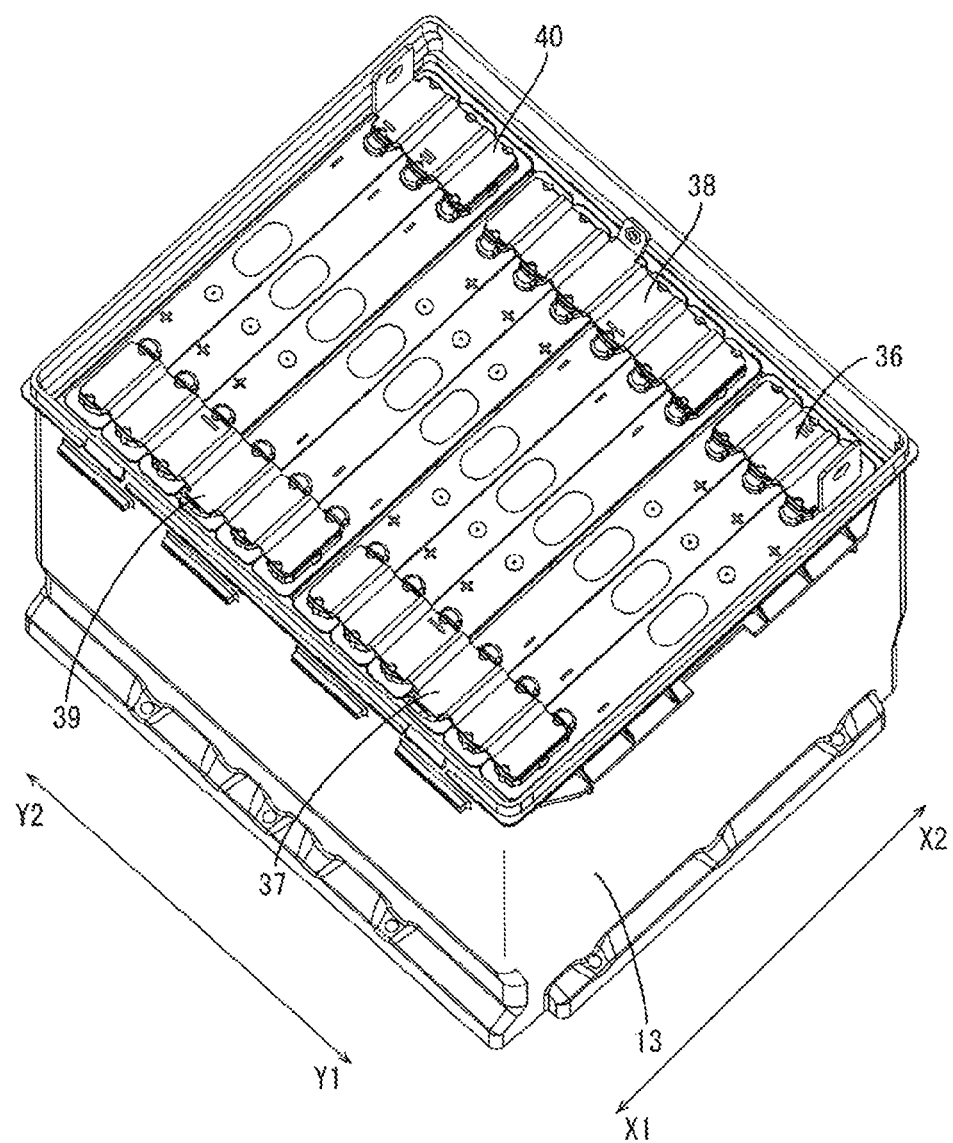
FIG. 5 is a perspective view showing a state in which a bus bar is mounted on the energy storage device of FIG. 4.

As shown in FIG. 5, terminal bus bars (connecting member) 36 to 40 as conductive members are connected to the positive electrode terminals 27 and the negative electrode terminals 29 by welding. On the arrow X2 side of the first set, a group of the positive electrode terminals 27 is connected by a first bus bar 36. Between the first set and the second set, a group of the negative electrode terminals 29 in the first set and a group of the positive electrode terminals 27 in the second set are connected by a second bus bar 37 on the arrow X1 side. Between the second set and the third set, a group of the negative electrode terminals 29 in the second set and a group of the positive electrode terminals 27 in the third set are connected by a third bus bar 38 on the arrow X2 side. Between the third set and the fourth set, a group of the negative electrode terminals 29 in the third set and a group of the positive electrode terminals 27 in the fourth set are connected by a fourth bus bar 39 on the arrow X1 side. On the arrow X2 side of the fourth set, a group of the negative electrode terminals 29 is connected by a fifth bus bar 40.

Referring also to FIG. 2, the first bus bar 36 located at one end of an electric flow is connected to the positive external terminal 20 via first electronic equipment 42A (e.g., fuse), second electronic equipment 42B (e.g., relay), a bus bar 43, and a bus bar terminal (not shown). The fifth bus bar 40 located at the other end of the electric flow is connected to the negative external terminal 21 via bus bars 44A, 44B and a negative electrode bus bar terminal (not shown). This enables each energy storage device 12 to be charged and discharged via the positive external terminal 20 and the negative external terminal 21. The electronic equipment 42A, 42B and bus bars 43, 43A, 44B for connecting electric components are attached to a circuit board unit 41 disposed above a plurality of stacked energy storage devices 12. The bus bar terminal is disposed on the lid 14.

(2) Electrical Configuration of Energy Storage Device

Figure 6:
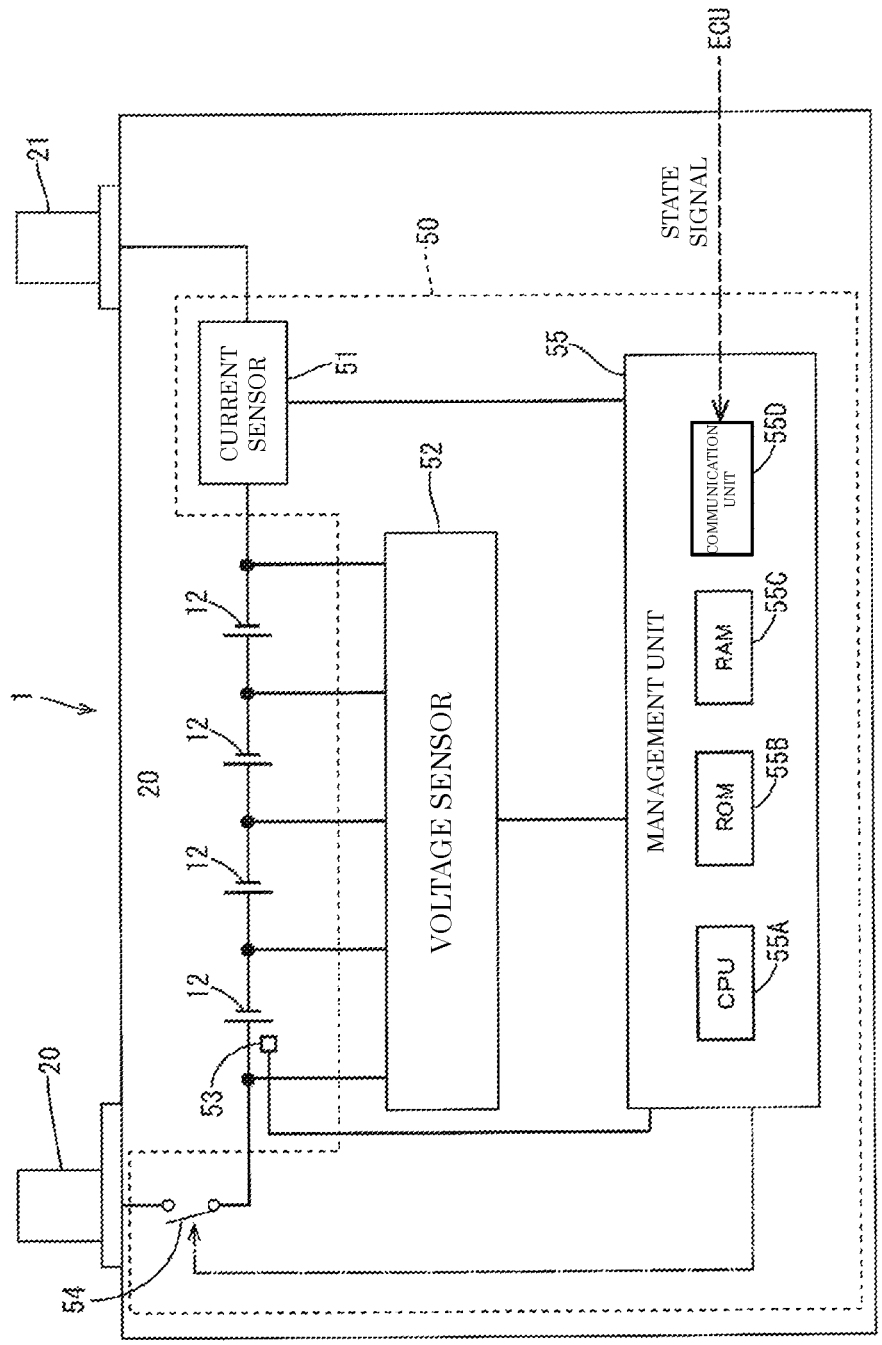
FIG. 6 is a block diagram showing an electrical configuration of an energy storage apparatus.
Figure 7:
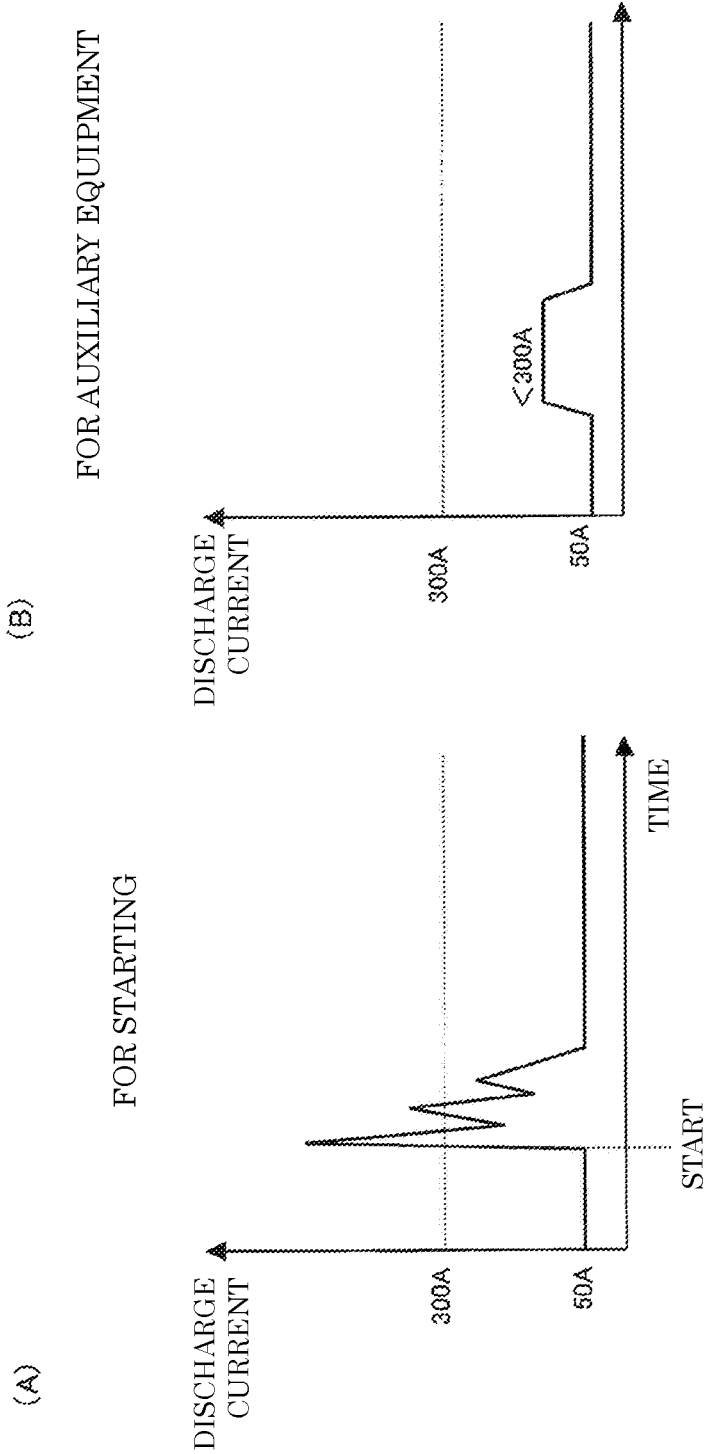
FIG. 7(A) is a graph showing a change in a discharge current of an energy storage device for starting.
FIG. 7(B) is a graph showing a change in a discharge current of an energy storage device for auxiliary equipment.

As shown in FIG. 6, the energy storage apparatus 1 is provided with the plurality of energy storage devices 12 described above and a battery management system (BMS) 50 that manages the energy storage devices 12.

The BMS 50 is mounted on the circuit board unit 41 shown in FIG. 2. The BMS 50 includes a current sensor 51 (an example of the acquisition unit and the current measurement unit), a voltage sensor 52, a temperature sensor 53, a relay 54, and a management unit 55.

The current sensor 51 is connected in series with the energy storage device 12. The current sensor 51 measures a current value I [A] of a current flowing through the energy storage device 12, detects the direction of the current, and outputs the measured current value I and the detected direction to the management unit 55.

The voltage sensor 52 is connected in parallel to each energy storage device 12. The voltage sensor 52 measures a voltage value V [V], which is the terminal voltage of each energy storage device 12, and outputs the measured value to the management unit 55.

The temperature sensor 53 is provided in any one of the energy storage devices 12. The temperature sensor 53 measures the temperature of the energy storage device 12 and outputs the measured temperature to the management unit 55. The temperature sensor 53 may be provided in each of two or more energy storage devices 12.

The relay 54 is connected in series with the energy storage device 12. The relay 54 protects the energy storage device 12 from overcharge and overdischarge and is opened and closed by the management unit 55.

The management unit 55 is operated by electric power supplied from the energy storage device 12 and includes a central processing unit (CPU) 55A, a read-only memory (ROM) 55B, a random-access memory (RAM) 55C, a communication unit 55D, and the like. The communication unit 55D is for communicating with an engine control unit (ECU) of the vehicle 2. The CPU 55A manages each unit of the energy storage apparatus 1 by executing various management programs stored in the ROM 55B.

The management unit 55 may include an application-specific integrated circuit (ASIC), a field-programmable gate array (FPGA), and the like in place of the CPU 55A or in addition to the CPU 55A.

(3) Setting of Energy Storage Device Management Mode

The management unit 55 can set the management mode of the energy storage device 12 and sets the management mode of the energy storage device 12 in accordance with information with which the use of the energy storage device 12 can be determined (hereinafter referred to as use information). The management mode will be described later. In the following description, the use of the energy storage device 12 may be referred to as the use of the energy storage apparatus 1.

Various information can be used as the use information. Here, the information on the output status of the energy storage device 12 will be described as an example of the use information. Specifically, the information on the output status is, for example, a current value of a discharge current (in other words, load current) flowing from the energy storage device 12 to the vehicle 2 or the temperature of the energy storage device 12. Here, the current value of the discharge current will be described as an example of the information on the output status. Hereinafter, when a current value is simply referred to, what is referred to is the current value of the discharge current.

FIG. 7(A) shows a change in the discharge current when the energy storage apparatus 1 (in other words, the energy storage device 12) is used for starting. FIG. 7(B) shows a change in the discharge current when the energy storage apparatus 1 is used for auxiliary equipment. As shown in FIG. 7(A), when the energy storage apparatus 1 is used for starting, at the time of starting the engine of the vehicle 2, a large current (e.g., a current of 300 A or more) flows from the energy storage device 12 to the starter in order to rotate the crankshaft of the engine. Normally, the discharge current flowing from the energy storage device 12 to the vehicle 2 becomes the largest when electric power is supplied to the starter.

As shown in FIG. 7(B), in the case for auxiliary equipment, since electric power is not supplied to the starter, the discharge current flowing through the energy storage device 12 does not exceed 300 A (typically 200 A or less). Although not shown in the figure, even in the case for backup, the discharge current flowing through the energy storage device 12 does not exceed 300 A. It can thus be determined whether or not the energy storage apparatus 1 is for starting based on whether or not a discharge current of 300 A or more flows. 300 A is an example of the first reference value.

However, a large current of 300 A or more may flow through the energy storage apparatus 1 due to an external short circuit. For this reason, when it is determined whether or not the energy storage apparatus 1 is for starting based only on the current value, the determination may be wrong. When there is a possibility that a large current of 300 A or more flows due to an external short circuit, it is possible to more accurately determine whether or not the energy storage apparatus 1 is for starting by using not only the current value but also a signal received from the ECU of the vehicle 2.

Specifically, the energy storage apparatus 1 receives a state signal indicating the operating state of the engine from the ECU of the vehicle 2 at regular time intervals. The state signal is, for example, a 1-bit signal, and 1 is transmitted during the operation of the engine, while 0 is transmitted during the stop of the engine. Therefore, the management unit 55 can determine that the engine has started when the state signal changes from 0 to 1 and can determine that the engine has stopped when the state signal changes from 1 to 0. The state signal is an example of the signal with which the start and stop of the engine of the vehicle 2 can be determined.

When a discharge current of 300 A or more flows from the energy storage apparatus 1 to the starter and the engine starts, the state signal changes from 0 to 1 within a fixed time from the time the discharge current of 300 A or more flows. Therefore, when the state signal changes from 0 to 1 within a certain period of time after a discharge current of 300 A or more flows, it can be determined that the energy storage apparatus 1 is for starting. On the other hand, even though a large current of 300 A or more flows, when the state signal does not change from 0 to 1 within a certain period of time thereafter, it can be determined that an external short circuit has occurred.

In a case where the energy storage apparatus 1 is for auxiliary equipment or backup, when the engine of the vehicle 2 starts and the state signal changes from 0 to 1, a discharge current of 300 A or more is not measured within a predetermined time immediately before the change. Thus, upon a change of the state signal from 0 to 1, when a discharge current of 300 A or more has not been measured within a predetermined period of time immediately before the change, it can be determined that the energy storage apparatus 1 is for auxiliary equipment or for backup.

It can be determined whether the energy storage apparatus 1 is for auxiliary equipment or for backup from the current value measured after the engine starts until the engine stops. Specifically, when the energy storage device 12 is for auxiliary equipment, a discharge current that is somewhat large flows to supply electric power from the energy storage device 12 to the auxiliary equipment. A somewhat large discharge current is, for example, a current of 100 A or more and less than 300 A. In contrast, in the case for backup, it is rare that a discharge current of 100 A or more flows, and the discharge current hardly flows during the start of the engine, after the start, and during traveling of the vehicle 2.

Therefore, in a case where the engine starts without a discharge current of 300 A or more being measured (i.e., in a case where the state signal changes from 0 to 1), when a discharge current of 100 A or more (an example of the second reference value) is measured after the start and before the stop of the engine (i.e., before the state signal changes from 1 to 0), it can be determined that the energy storage apparatus 1 is for auxiliary equipment, and when the engine stops without a current value of 100 A or more being measured, it can be determined that the energy storage apparatus 1 is for backup.

(4) Management of Energy Storage Device

Although there are various kinds of management of the energy storage device 12, estimation of an internal resistance value and estimation of a charge capacity will be described here.

(4-1) Estimation of Internal Resistance Value

FIG. 8(A) shows a change in the voltage of the energy storage device 12 during the cranking (i.e., during the engine start) in which the crankshaft of the engine is rotated. In FIG. 8(A), ΔV is the difference between the voltage of the energy storage device 12 immediately before the cranking and the lowest voltage during the cranking. FIG. 8(B) shows a change in the discharge current during the cranking. In FIG. 8(B), ΔI is the difference between the discharge current immediately before the cranking and the maximum discharge current during the cranking.

As shown in FIG. 8(A), the voltage of the energy storage device 12 drops when the energy storage device 12 is discharged. This can be explained by assuming that the energy storage device 12 has a resistance (hereinafter referred to as internal resistance) therein. The internal resistance increases with deterioration in the energy storage device 12 and is thus correlated with the deterioration in the energy storage device 12. Therefore, the management unit 55 estimates the resistance value (internal resistance value) of the internal resistance of the energy storage device 12 as one of indices for determining the deterioration in the energy storage device 12. The internal resistance value is estimated by Equation 1 below:

$$\text{Internal resistance value }[\Omega]=\Delta V/\Delta I \qquad \text{Equation 1}$$

For example, in the example shown in FIGS. 8(A) and 8(B), the estimated value of the internal resistance value is 3.63 [mΩ] (=|12 V−10 V|/|50 A−600 A|).

Since the internal resistance value varies depending on the voltage and current used for the estimation, it is desirable to estimate the internal resistance value by using the voltage and current at the timing in accordance with the use of the energy storage device 12.

For example, in the case for starting, a large current is discharged at the time of cranking. When the energy storage device 12 has deteriorated, a voltage drop increases at the time of discharge with a large current, and the voltage drop may fall below an allowable voltage of a vehicle system. Therefore, in the case for starting, it is preferable to use the voltage and current during the cranking (in other words, during the engine start), which is the main purpose. As described above, it is preferable to use the difference between the voltage of the energy storage device 12 immediately before the cranking and the lowest voltage during the cranking as ΔV, and to use the difference between the discharge current immediately before the cranking and the maximum discharge current during the cranking as ΔI.

In the case of a use where the discharge current is relatively small, such as the use for auxiliary equipment, it is not appropriate to estimate the internal resistance value based on the allowable voltage of the vehicle system (the voltage drop of the energy storage device 12) because no voltage drop such as in the use for starting is seen, and it is desirable to simply perform estimation using a rate of increase from the initial value. For example, it is desirable to use the voltage and current when the discharge current of the energy storage device 12 becomes minimal. For example, in the example shown in FIG. 7(B), the current value when the discharge current is the minimum is 50 A. Thus, when the current value changes from 50 A, it is preferable to use the difference between the voltage of the energy storage device 12 before the change and the lowest voltage under change as ΔV, and to use the difference between the current value before the change (i.e., 50 A) and the maximum discharge current during the change as ΔI.

In the case for backup, since there is almost no change in voltage or current, the timing for estimating the internal resistance value can be set arbitrarily.

For the above reason, the management unit 55 estimates the internal resistance value by using the voltage and current during the engine start (in other words, the timing for starting the engine) in the case for starting the engine, and estimates the internal resistance value by using the voltage and current at the timing when the discharge current reaches a predetermined value in the case for auxiliary equipment. In the case for backup, the management unit 55 estimates the internal resistance value at pre-set predetermined timing. That is, the management unit 55 sets the timing for estimating the internal resistance value in accordance with the use of the energy storage device 12. The timing for estimating the internal resistance value is an example of the management mode.

(4-2) Estimation of Charge Capacity of Energy Storage Device

The charge-discharge pattern of the energy storage device 12 and the control range of the SOC vary depending on the use. For example, when the vehicle 2 is an idling stop vehicle, the energy storage device 12 for starting is often used with the control range of the SOC set to about 80%. In contrast, in the case for auxiliary equipment or backup equipment, the control range of the SOC is generally set to approximately 100%. In the case of an idling stop vehicle, the SOC of the energy storage device 12 for starting varies greatly within a range of approximately 0% to 80%. In contrast, in the case for auxiliary equipment, since the electric power supplied is smaller than that in the case for starting, the fluctuation range of the SOC is smaller than that in the case for starting. In the case for backup, the SOC is maintained at approximately 100%. As thus described, the charge-discharge pattern of the energy storage device 12 and the control range of the SOC vary depending on the use.

As described above, while a discharge current of 300 A or more flows in the case for starting, a discharge current of 100 A or more and less than 300 A flows in the case for auxiliary equipment, and a discharge current of less than 100 A flows in the case for backup. In this sense, the charge-discharge pattern of the energy storage device 12 varies depending on the use.

The charge-discharge pattern and the control range of the SOC affect a decrease in the charge capacity of the energy storage device 12. For example, between a case where the energy storage device 12 is left at a SOC of 80% and a case where the energy storage device 12 is left at a SOC of 100%, the degree of reduction in the charge capacity of the energy storage device 12 is different, and in general, the charge capacity is greatly reduced at the SOC of 100%. As described above, the charge-discharge pattern of the energy storage device 12 and the control range of the SOC vary depending on the use. It can thus be said that the use of the energy storage device 12 affects the reduction of the charge capacity. Therefore, the management unit 55 estimates the charge capacity of the energy storage device 12 in accordance with the use.

An example of the estimation of the charge capacity of the energy storage device 12 will be described. The management unit 55 has internal data (initial capacity internal value) of the initial capacity of the energy storage device 12 in nAh units, and therefore, when the initial capacity of the energy storage device 12 is set to 60 Ah, the internal value of the initial capacity is 60 billion [nAh].

The ROM 55B of the management unit 55 stores a capacity estimation table (an example of the estimation data) as shown in the following table. The capacity estimation table is a table in which a capacity subtraction value is associated with each temperature of the energy storage device 12. The management unit 55 measures the temperature of the energy storage device 12 with the temperature sensor 53 at predetermined time intervals (example: every 10 minutes) and estimates the charge capacity of the energy storage device 12 by subtracting a capacity subtraction value corresponding to the measured temperature from the initial capacity internal value.

TABLE 1

| Temperature | Capacity subtraction value [nAh] |
|---|---|
| −40° C. | 1 |
| −39° C. | 2 |
| . | . |
| . | . |
| . | . |
| −0° C. | 10 |
| 1° C. | 12 |
| 2° C. | 15 |
| . | . |
| . | . |
| . | . |
| 25° C. | 100 |
| . | . |
| . | . |
| . | . |
| 45° C. | 500 |
| . | . |
| . | . |
| . | . |
| 60° C. | 2000 |

The ROM 55B of the management unit 55 stores a capacity estimation table for a case where the energy storage apparatus 1 is used for starting, a capacity estimation table for a case where the energy storage apparatus 1 is used for auxiliary equipment, and a capacity estimation table for a case where the energy storage apparatus 1 is used for backup. The management unit 55 sets a capacity estimation table corresponding to the use of the energy storage apparatus 1 as a capacity estimation table used for estimating the charge capacity of the energy storage device 12. The capacity estimation table is an example of the management mode.

(5) Management Mode Setting Process

Figure 9:
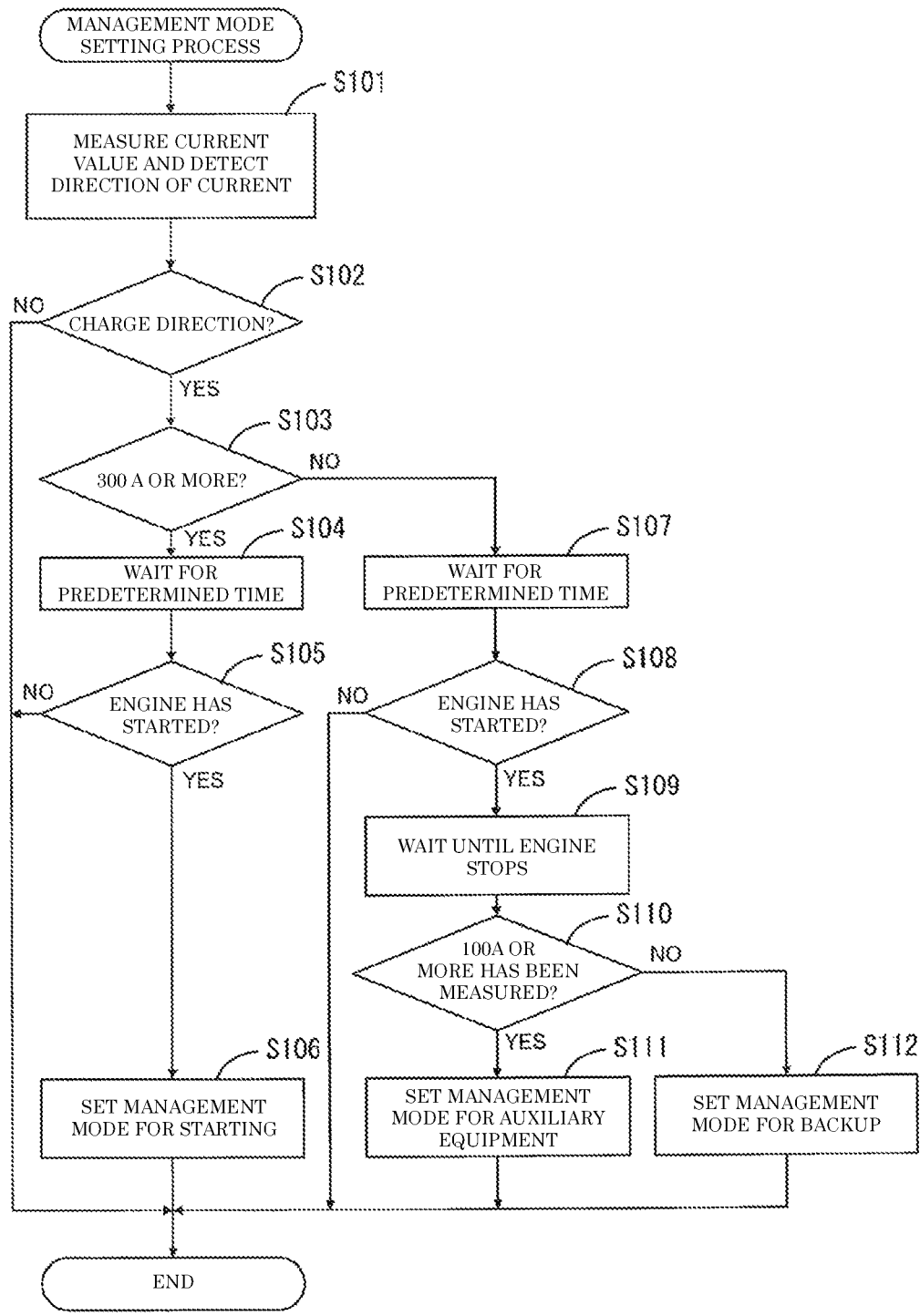
FIG. 9 is a flowchart of a management mode setting process.

A management mode setting process executed by the management unit 55 will be described with reference to FIG. 9. The present process is repeatedly executed continuously or at regular time intervals while electric power is supplied from the energy storage device 12 to the management unit 55.

In S101, the management unit 55 measures the current value of the current flowing through the energy storage device 12 with the current sensor 51 and detects the direction of the current.

In S102, the management unit 55 determines whether the direction of the current is a discharge direction or the charge direction, and the management unit 55 proceeds to S103 when the direction is the discharge direction (i.e., in the case of the discharge current), and ends the present process when the direction is the charge direction (i.e., in the case of the charge current).

In S103, the management unit 55 determines whether or not the current value of the discharge current is 300 A or more, and the management unit 55 proceeds to S104 when the current value is 300 A or more, and proceeds to S107 when the current value is less than 300 A.

In S104, the management unit 55 waits until a predetermined time elapses, and proceeds to S105 when the predetermined time elapses. When the engine starts before the elapse of the predetermined time, the management unit 55 may proceed to S105 without waiting for the predetermined time to elapse.

In S105, the management unit 55 determines whether or not the engine has started before the elapse of the predetermined time, and the management unit 55 proceeds to S106 when the engine has been started, and ends the present process when the engine has not been started (i.e., when a large current is measured due to an external short circuit).

In S106, the management unit 55 sets a management mode corresponding to the energy storage device 12 for starting.

In S107, the management unit 55 waits for a predetermined period of time, and proceeds to S108 when the predetermined period of time has elapsed. When the engine starts before the elapse of the predetermined time, the management unit 55 may proceed to S108 without waiting for the predetermined time to elapse.

In S108, the management unit 55 determines whether or not the engine has started before the elapse of the predetermined time, and the management unit 55 proceeds to S109 when the engine has been started, and ends the present process when the engine has not been started.

In S109, the management unit 55 waits until the engine stops (i.e., the state signal changes from 1 to 0), and proceeds to S110 when the engine stops. When a current value of 100 A or more is measured before the engine stops, the management unit 55 may proceed to S110 without waiting for the engine to stop.

In S110, the management unit 55 determines whether or not the discharge current of 100 A or more has been measured before the engine stops, and the management unit 55 proceeds to S111 when the discharge current has been measured, and proceeds to S112 when the discharge current has not been measured.

In S111, the management unit 55 sets a management mode corresponding to the energy storage device 12 for auxiliary equipment.

In S112, the management unit 55 sets a management mode corresponding to the energy storage device 12 for backup.

(6) Effects of the Embodiment

According to the above energy storage apparatus 1, since the management mode of the energy storage device 12 is set in accordance with the use information, the energy storage device 12 can be managed in accordance with the use. As a result, the management unit 55 having the same specification becomes usable for various uses, and the cost related to the management unit 55 (energy storage apparatus 1) can be reduced.

According to the energy storage apparatus 1, for example, the energy storage apparatus 1 having been used for starting can be recycled as one for auxiliary equipment. Since the output power required for auxiliary equipment is smaller than that for starting, even when the energy storage device 12 having been used for starting becomes unusable due to its service life, the energy storage device 12 may still be used for the auxiliary equipment. Since the management mode of the energy storage device 12 is different between the device for starting and the device for auxiliary equipment, it has hitherto been not possible to recycle the energy storage apparatus 1 used for starting as one for auxiliary equipment. In contrast, according to the energy storage apparatus 1, the management mode of the energy storage device 12 is set in accordance with the use, so that the energy storage apparatus 1 having been used for starting can be recycled as one for auxiliary equipment. As a result, the energy storage apparatus 1 can be effectively used, which also contributes to environmental protection.

According to the energy storage apparatus 1, it is possible to prevent inappropriate management of the energy storage device 12 caused by mistaking the energy storage apparatus 1 for starting and the energy storage apparatus 1 for auxiliary equipment. Specifically, when the energy storage apparatus for starting and the energy storage apparatus for auxiliary equipment are separately prepared as in the conventional case, there may occur an error such as that the energy storage apparatus for auxiliary equipment is used for starting. This is likely to occur when a general user replaces an energy storage apparatus by himself or herself. When such an error occurs, the energy storage device 12 is managed inappropriately. In contrast, since the energy storage apparatus 1 sets the management mode corresponding to the use of the energy storage device 12, inappropriate management of the energy storage device 12 can be prevented.

According to the energy storage apparatus 1, there is also an advantage that any type of vehicle is selectable as the vehicle on which the energy storage apparatus 1 is mounted. For example, as a method of determining the use of the energy storage device 12, there is considered a method of determining the use of the energy storage device 12 by receiving, from the ECU of the vehicle 2, information indicating what use the energy storage device is being used for. However, in the case of the vehicle 2 that does not transmit such information, the use cannot be determined. In contrast, according to the energy storage apparatus 1, the management mode corresponding to the use can be set without receiving such information from the vehicle 2, whereby any type of vehicle is selectable as the vehicle on which the energy storage apparatus 1 is mounted.

According to the energy storage apparatus 1, the use information is information on the output status of the energy storage device 12 (here, the current value of the discharge current). With the output status of the energy storage device 12 varying depending on the use, the information on the output status is a useful clue in the case of trying to know what use the energy storage device 12 is being used for. Therefore, when the information on the output status is acquired, the energy storage device 12 can be managed in accordance with the use.

According to the energy storage apparatus 1, even though a large current of 300 A or more is measured, when the engine does not start thereafter, it is determined that an external short circuit has occurred, and the management mode corresponding to the energy storage device 12 for starting is not set, so that an error in setting can be reduced as compared to a case where the setting is performed only based on the current value.

According to the energy storage apparatus 1, after the engine starts without the current value of 300 A or more being measured, the management mode corresponding to the energy storage device 12 for auxiliary equipment is set when a current value of 100 A or more is measured until the engine stops, and the management mode corresponding to the energy storage device 12 for backup is set when the engine stops without the current value of 100 A or more being measured, so that the energy storage device 12 can be managed in accordance with the use.

According to the energy storage apparatus 1, the timing for estimating the internal resistance value is set in accordance with the use information, so that the internal resistance value can be estimated at appropriate timing in accordance with the use of the energy storage device 12.

According to the energy storage apparatus 1, with the capacity estimation table being set in accordance with the use information, the charge capacity of the energy storage device 12 can be estimated accurately as compared to a case where the same capacity estimation table is used regardless of the use.

Other Embodiments

The techniques disclosed in the present specification are not limited to the embodiment described using the above description and the drawings, but the following embodiments are also within a technical scope disclosed by the present specification.

(1) In the above embodiment, when the engine starts after the current value of 300 A or more is measured, the management mode corresponding to the energy storage device 12 for starting is set. In contrast, in a case where the possibility of occurrence of an external short circuit is low, when the current value of 300 A or more is measured, the management mode corresponding to the energy storage device 12 for starting may be set regardless of whether or not the engine starts after the measurement.

(2) In the above embodiment, the case has been described as an example where the energy storage device 12 is used for any of starting, auxiliary equipment, and backup, but there is also a case where the energy storage device 12 is used only for either the starting or the auxiliary equipment. In this case, when the engine starts without the current value of 300 A or more being measured, the management mode corresponding to the energy storage device 12 for auxiliary equipment may be set regardless of whether or not the current value of 100 A or more is measured after the engine start.

(3) In the above embodiment, the current value of the discharge current has been described as an example of the information on the output status, but the information on the output status is not limited thereto. For example, the information on the output status may be the temperature of the energy storage device 12. Specifically, in the case of the energy storage device 12 for starting, since a large current of 300 A or more flows, the temperature of the energy storage device 12 becomes high. In contrast, in the case for auxiliary equipment, since a medium current of 100 A or more and less than 300 A flows, the temperature becomes higher to some extent, but the temperature does not become as high as that for starting. In the case for backup, the battery is hardly discharged, and hence the temperature becomes low. As described above, the temperature of the energy storage device 12 is correlated with the output status of the energy storage device 12, and it can thus be said that the temperature of the energy storage device 12 is information on the output status of the energy storage device 12. When the temperature is used as the information on the output status, the temperature sensor 53 is an example of the acquisition unit.

(4) In the above embodiment, information on the output status of the energy storage device 12 has been described as an example of the use information, but the use information may be information on the input/output status of the energy storage device 12. For example, the SOC changes due to both the charge (i.e., input) and discharge (i.e., output) of the energy storage device 12, and it can thus be said that the change in SOC is information on the input/output status of the energy storage device 12. Therefore, the change in SOC may be used as the use information.

Specifically, for example, as described above, the SOC of the energy storage device 12 for starting fluctuates greatly within a range of approximately 0% to 80%. In the case for auxiliary equipment, since the electric power supplied is smaller than that in the case for starting, the fluctuation range of the SOC is smaller than that in the case for starting. In the case for backup, the SOC is maintained at approximately 100%. Thus, the SOC may be recorded in time series, and the management mode of the energy storage device 12 may be set depending on in what use the SOC change pattern matches the recorded SOC change pattern.

The information on the input/output status may be a change in the open circuit voltage (OCV) of the energy storage device 12. The OCV is not limited to a voltage when the circuit is open but may be a voltage when the current value of the current flowing through the energy storage device 12 is less than a predetermined reference value. There being a high correlation between the OCV and the SOC, and it can thus be said that the change in the OCV is information on the input/output status of the energy storage device 12. When the OCV is used, the voltage sensor 52 is an example of the acquisition unit.

(5) In the above embodiment, the timing for estimating the internal resistance value and the capacity estimation table have been described as examples of the management mode, but the management mode is not limited thereto.

For example, the management unit 55 may manage the energy storage device 12 by using management parameters, and in this case, the management parameters may be set in accordance with the use information. Specifically, for example, when the SOC rises to a predetermined upper limit value (an example of the management parameter), the management unit 55 opens the relay 54 to protect the energy storage device 12 from overcharge, and when the SOC falls to a predetermined lower limit value (an example of the management parameter), the management unit 55 opens the relay 54 to protect the energy storage device 12 from overdischarge. Appropriate values of these upper and lower limit values may vary depending on the use. Hence, the lower limit value and the upper limit value may be set in accordance with the use.

For example, when the energy storage apparatus 12 is for starting, the energy storage apparatus except for the energy storage apparatus 12 for starting is often not mounted on the vehicle 2. Therefore, from the viewpoint of ensuring the control power source of the vehicle 2 (ensuring safety), it may be desired to delay the timing for opening the relay 54 as much as possible even when overcharge or overdischarge is predicted. In this case, it is conceivable to set the upper limit value to the higher voltage side and set the lower limit value to the lower voltage side. On the other hand, in the case for auxiliary equipment, a high-voltage energy storage apparatus for driving a motor is mounted, as in a hybrid vehicle, whereby the risk of loss of control power supply is low as compared to that in the case for starting. It is thus conceivable to set the upper limit value to the lower-pressure side and set the lower limit value to the higher-pressure side from the viewpoint of more reliable protection from overcharge and overdischarge.

The management parameter may be a threshold value as a reference for determining the abnormality of the energy storage device 12. For example, in a case where the abnormality is determined upon a rise in the temperature of the energy storage device 12 to or above a threshold value, when an appropriate threshold value varies depending on the use of the energy storage device 12, the management unit 55 may set the threshold value in accordance with the use information.

(6) The management unit 55 may set a process of detecting the abnormality of the energy storage apparatus 1 in accordance with the use information. For example, in the case for starting, a large current of 300 A or more should flow to start the engine, but there is a possibility that the large current of 300 A or more may not flow due to a connection failure in a circuit inside the energy storage apparatus 1. Therefore, when the large current of 300 A or more does not flow in the case for starting, this may be detected as abnormal.

In contrast, in the case for auxiliary equipment, the large current of 300 A or more should not flow, but the large current of 300 A or more may flow due to an external short circuit. Therefore, when the large current of 300 A or more flows in the case for auxiliary equipment, this may be detected as abnormal.

(7) In the above embodiment, the charge capacity of the energy storage device 12 has been described as an example of the state of the energy storage device 12, but the state of the energy storage device 12 is not limited thereto. For example, the state of the energy storage device 12 may be a state of charge (SOC). Generally, the management unit 55 estimates the SOC in order to manage the energy storage device 12. As a method of estimating the SOC, there is known a method of estimating the SOC by specifying a SOC corresponding to a measured OCV from an OCV-SOC table (an example of the estimation table) indicating the correlation between the OCV and the SOC. In this case, when the appropriate OCV-SOC table varies depending on the use of the energy storage device 12, the OCV-SOC table may be set in accordance with the use information.

The management unit 55 may estimate a state of health (SOH) as the state of the energy storage device 12. In this case, when the table (SOH estimation table) used for the estimation varies depending on the use, the SOH estimation table may be set in accordance with the use information.

The management unit 55 may estimate the average temperature of the plurality of energy storage devices 12 from the temperature measured by the temperature sensor 53 provided in any of the energy storage devices 12. In this case, when the table (temperature estimation table) used for the estimation varies depending on the use, the temperature estimation table may be set in accordance with the use information.

(8) In the above embodiment, the uses for starting, auxiliary equipment, and backup have been described as examples of the use of the energy storage device 12, but the use of the energy storage device 12 is not limited thereto. For example, the energy storage device 12 may be one for a mobile body which is mounted on a forklift or an automatic guided vehicle (AGV) traveling with an electric motor and supplies electric power to the electric motor, or may be one for an uninterruptible power supply (UPS) which is provided in the UPS and stores electric power.

In the case for the mobile body, the SOC varies greatly in the range of 0% to 100%, similarly to the case for starting. In the case for the UPS, the SOC is maintained at approximately 100%, similarly to the case for backup. Therefore, in a case where the management mode is set in accordance with whether the use is for the mobile body or for the UPS, the change pattern of the SOC or the OCV may be acquired as use information, and the management mode may be set in accordance with the use information.

(9) In the above embodiment, the case of acquiring the use information by measuring the current value of the discharge current with the current sensor 51 has been described as an example, but the information to be acquired as the use information and the method of acquiring the information are not limited thereto.

For example, the energy storage apparatus 1 may be provided with an operation unit, and use information may be acquired by receiving a designation of the use (e.g., starting, auxiliary equipment, or backup) from an operator via the operation unit. For example, a dip switch can be used as the operation unit.

The energy storage apparatus 1 may be provided with a communication unit for receiving the use information (e.g., information indicating the use for starting, auxiliary equipment, or backup), and the use information may be acquired by receiving use information transmitted from the outside. The communication may be wired communication or wireless communication. In the case of wireless communication, the use information may be received from a dedicated remote controller or may be received from a portable terminal (so-called smartphone, tablet computer, etc.). The communication unit may be connected to the Internet, and the use information may be received via the Internet.

(10) The setting process described in the above embodiment is an example. The setting process is not limited to the process described in the above embodiment. For example, when the engine starts (i.e., when the state signal changes from 0 to 1), the management unit 55 determines whether or not a current value of 300 A or more has been measured within a predetermined time retroactively from the time of the engine start, and when the current value has been measured, the management mode corresponding to the energy storage device 12 for starting may be set. That is, in this case, the setting process is not executed at regular time intervals, but the setting process is started with the engine start as a trigger.

(11) The energy storage apparatus 1 described in the above embodiment sets the management mode in accordance with the use, so that the energy storage apparatus 1 having been used for one use can be recycled thereafter for another use. However, it may not be desirable for the energy storage apparatus 1 having been used for a particular use to be subsequently recycled for another particular use. Therefore, in this case, recycling from one specific use to another specific use may be prohibited.

For example, recycling from the use for auxiliary equipment to the use for starting (in other words, switching of the use) may be prohibited. This is because, since the output power required for starting is higher than that required for auxiliary equipment, the energy storage apparatus 1 having become unable to output electric power required for auxiliary equipment due to its service life cannot be recycled for starting. For this reason, the ROM 55B may store information to the effect that recycling from the use for auxiliary equipment to the use for starting is prohibited.

Then, at the time of setting the management mode corresponding to the use information, the management unit 55 stores into the RAM 55C the use corresponding to the management mode after the setting as the current use, and thereafter, at the time of setting the management mode corresponding to the use information, the management unit 55 disables the energy storage apparatus 1 when the use after the setting is the use for which recycling is prohibited from the use before the setting (i.e., the present use stored in the RAM 55C). The energy storage apparatus 1 can be disabled, for example, by opening the relay 54 connected in series with the energy storage device 12. As a result, the energy storage apparatus 1 can be prevented from being recycled for the prohibited use.

(12) In the above embodiment, the case has been described as an example where the state signal of 0 or 1 is received at regular time intervals as the signal with which the start and stop of the engine can be determined. In contrast, the vehicle 2 may transmit a start signal when the engine starts, and may transmit a stop signal when the engine stops. The energy storage apparatus 1 may receive the start signal and the stop signal as signals with which the start and stop of the engine can be determined.

(13) In the above embodiment, the case has been described as an example where the state signal changes from 0 to 1 after a large current of 300 A or more flows. In contrast, when a driver instructs to start the engine, the vehicle 2 may transmit a starting start signal to the energy storage apparatus 1 before the engine start is started. In this case, the current of 300 A or more flows after the management unit 55 receives the starting start signal. Therefore, the management unit 55 may set the management mode corresponding to the energy storage device 12 for starting after receiving the starting start signal when the current value of 300 A or more is measured within a certain time. When the current value of 300 A or more is measured and the starting start signal is not received within a predetermined period of time immediately before the measurement, the management unit 55 may determine that an external short circuit has occurred.

(14) In the above embodiment, the energy storage apparatus 1 mounted on the vehicle 2 has been described as an example, but the energy storage apparatus 1 is not limited to that mounted on the vehicle 2. For example, the energy storage apparatus 1 may be mounted on a ship or aircraft or may be mounted on a motorcycle.

(15) The management unit 55 may set the management mode by receiving use information from the outside and rewriting a control program in accordance with the received use information.

(16) In the above embodiment, the lithium ion battery has been described as an example of the energy storage device 12, but the energy storage device 12 may be a lead-acid battery or may be a capacitor.

(17) Artificial Intelligence (AI) may be mounted on the energy storage apparatus 1, and the AI may determine the use of the energy storage device 12 to set the management mode.

DESCRIPTION OF REFERENCE SIGNS

1: energy storage apparatus
2: vehicle
12: energy storage device
51: current sensor (an example of acquisition unit and current measurement unit)
52: voltage sensor (an example of acquisition unit)
53: temperature sensor (an example of acquisition unit)
55: management unit
55D: communication unit (an example of acquisition unit)

The invention claimed is:

1. An energy storage apparatus comprising:
an energy storage device;
an acquisition unit that acquires information with which a use of the energy storage device is able to be determined; and
a management unit that manages the energy storage device in a set management mode,
wherein the management unit sets the management mode of the energy storage device in accordance with the information acquired by the acquisition unit, and
at a time of setting a management mode corresponding to the information, the management unit disables the energy storage apparatus when a use after the setting is a use prohibited from being switched from a use before the setting.

2. The energy storage apparatus according to claim 1, wherein the information comprises information on an output status or an input/output status of the energy storage device.

3. The energy storage apparatus according to claim 2, wherein
the energy storage device is mounted on a vehicle,
the acquisition unit comprises a current measurement unit that measures a current value of a discharge current of the energy storage device, and
the management unit sets a management mode corresponding to an energy storage device for starting, the energy storage device being configured to start an engine of the vehicle, when a current value equal to or greater than a first reference value is measured by the current measurement unit.

4. An energy storage apparatus comprising:
an energy storage device;
an acquisition unit that acquires information with which a use of the energy storage device is able to be determined; and
a management unit that manages the energy storage device in a set management mode,
wherein the management unit sets the management mode of the energy storage device in accordance with the information acquired by the acquisition unit,
the information is information on an output status or an input/output status of the energy storage device,
the energy storage device is mounted on a vehicle,
the acquisition unit includes
a current measurement unit that measures a current value of a current flowing through the energy storage device, and
a communication unit that receives a signal with which a start and stop of the engine are able to be determined from the vehicle, and
the current measurement unit measures a current value equal to or greater than a first reference value, and when the engine starts after the measurement, the management unit sets a management mode corresponding to an energy storage device for starting, the energy storage device being configured to start the engine.

5. The energy storage apparatus according to claim 4, wherein when the engine starts without the current measurement unit measuring a current value equal to or greater than the first reference value, the management unit sets a management mode corresponding to an energy storage device for auxiliary equipment, the energy storage device supplying electric power to auxiliary equipment of the vehicle.

6. The energy storage apparatus according to claim 4, wherein, after the engine starts without the current measurement unit measuring a current value equal to or greater than the first reference value and before the engine stops, when a current value equal to or greater than a second reference value that is smaller than the first reference value is measured, the management unit sets a management mode corresponding to an energy storage device for auxiliary equipment, the energy storage device supplying electric power to the auxiliary equipment of the vehicle, and when the engine stops without the current value equal to or greater than the second reference value being measured, the management unit sets a management mode corresponding to an energy storage device for backup.

7. The energy storage apparatus according to claim 1, wherein
the management of the energy storage device comprises estimation of an internal resistance value of the energy storage device, and
the management unit sets timing for estimating the internal resistance value in accordance with the information.

8. The energy storage apparatus according to claim 1, wherein
the management of the energy storage device comprises estimation of a state of the energy storage device by using estimation data, and
the management unit sets the estimation data in accordance with the information.

9. The energy storage apparatus according to claim 1, wherein the management unit sets a process of detecting abnormality of the energy storage apparatus in accordance with the information.

10. The energy storage apparatus according to claim 1, wherein the acquisition unit comprises a communication unit that receives the information from external equipment.

11. The energy storage apparatus according to claim 1, wherein the acquisition unit comprises an operation unit that receives an input operation for the information.

* * * * *